May 2, 1967   J. W. ANDERSON   3,316,583
WINDSHIELD WIPER ARM AND BLADE ASSEMBLY
Filed Sept. 6, 1955   2 Sheets-Sheet 1
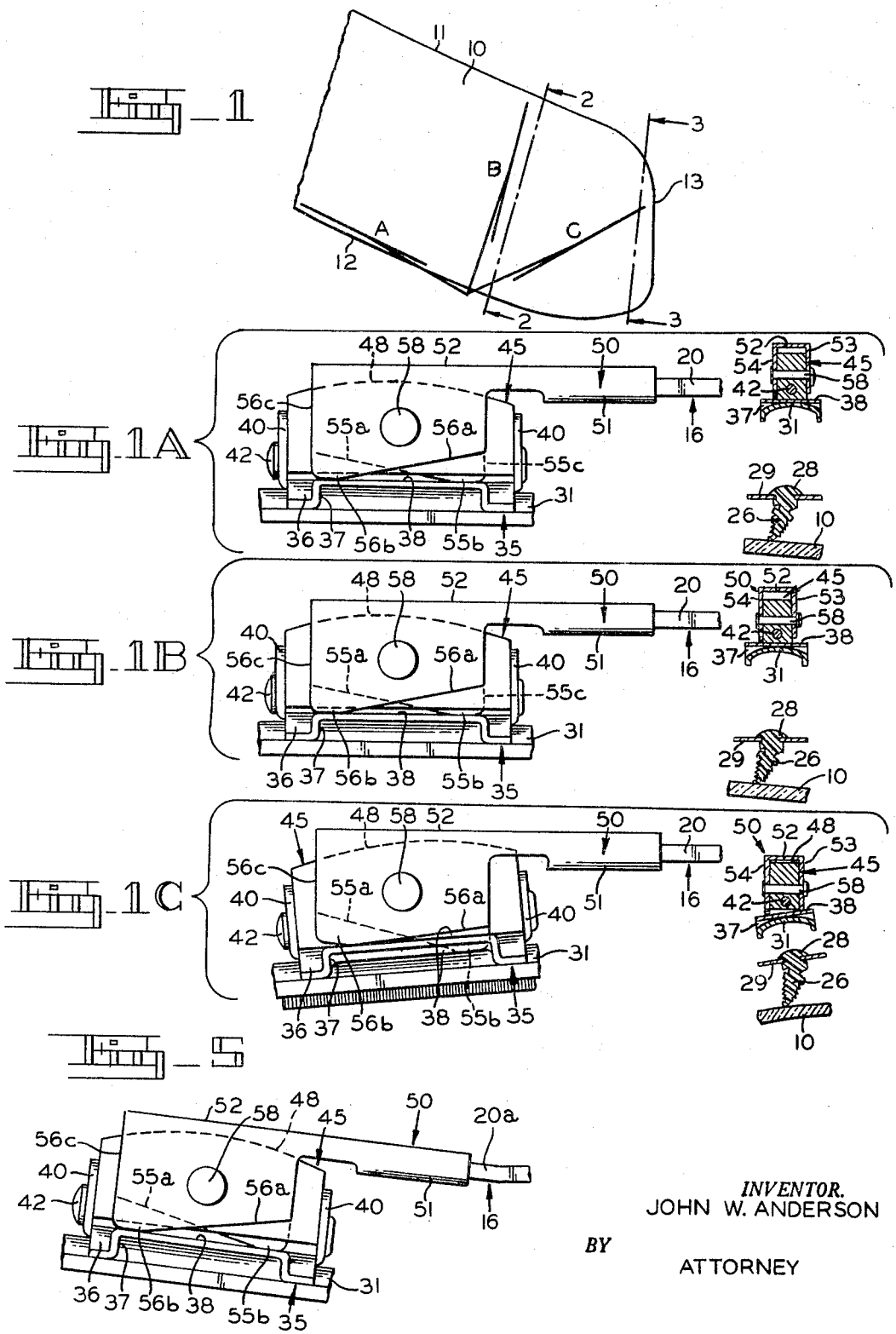
INVENTOR.
JOHN W. ANDERSON
BY
ATTORNEY May 2, 1967 J. W. ANDERSON 3,316,583
WINDSHIELD WIPER ARM AND BLADE ASSEMBLY
Filed Sept. 6, 1955 2 Sheets-Sheet 2
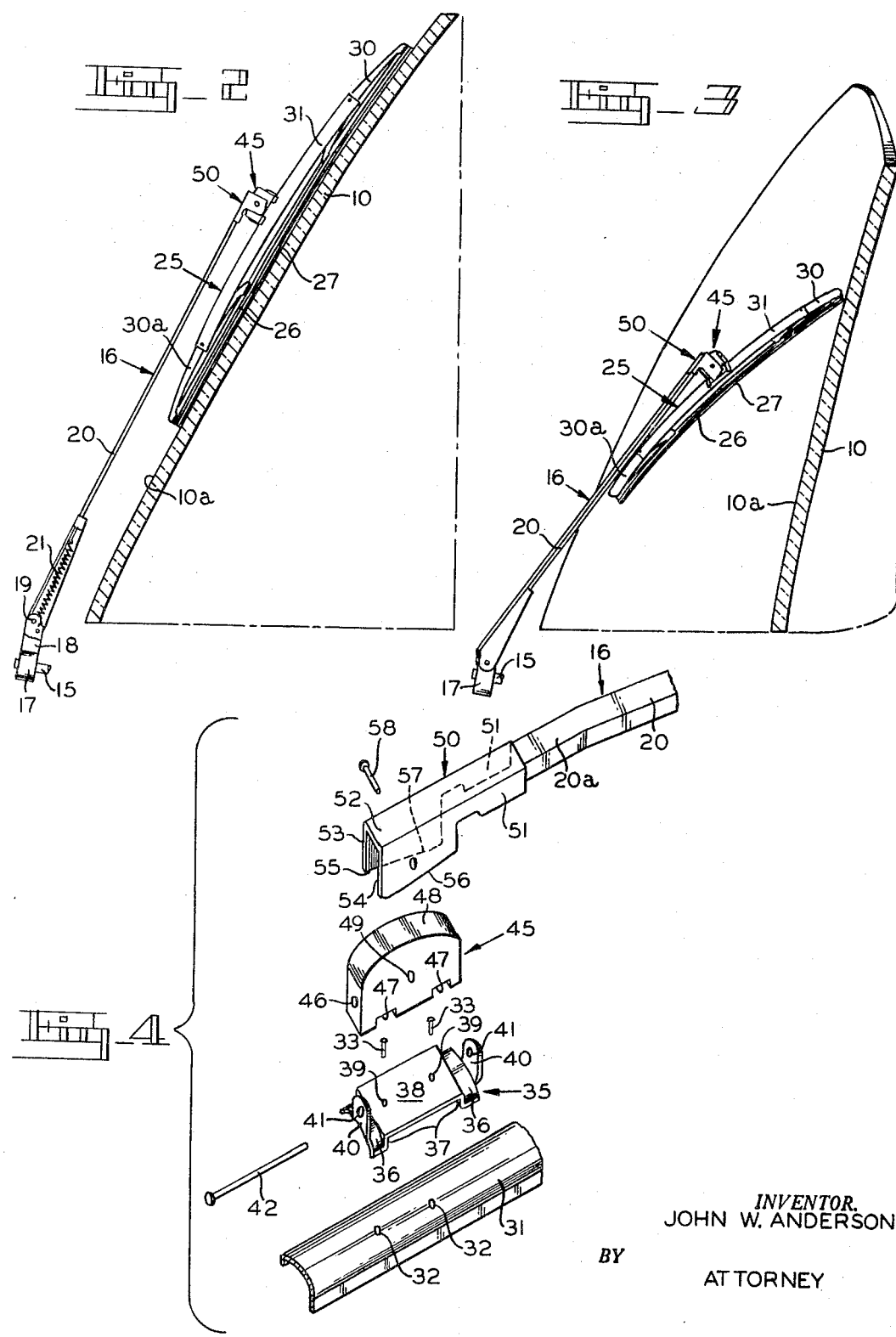
INVENTOR.
JOHN W. ANDERSON
BY
ATTORNEY

# United States Patent Office 3,316,583
Patented May 2, 1967

3,316,583
WINDSHIELD WIPER ARM AND BLADE
ASSEMBLY
John W. Anderson, 1075 Grant St., Gary, Ind. 46404
Filed Sept. 6, 1955, Ser. No. 532,640
23 Claims. (Cl. 15—250.23)

The present invention relates to a wiper arm and blade assembly for the wiping of a vehicular windshield or the like.

The utilization of curved windshields in automobiles, trucks and other vehicles is now practically universal. Quite recently, the utilization of windshields of appreciably varying curvature and of variant vertical inclination, commonly referred to as "wrap-around" windshields, has become prevalent for automotive use. The wiping of such windshields of varying contour and inclination has raised many problems which are of the utmost importance to the automotive industry and to the motoring public, because of the safety factor which is involved in the accurate and efficient wiping of the windshield surface.

In order to wipe a laterally and vertically variant "wrap-around" windshield by the use of a wiper blade and arm oscillatable about a fixed axis, the blade must conform to the marginal portion of the windshield surface which recedes appreciably from the axis of the actuating shaft. In the operation of the conventional arm and blade assembly, the resultant receding movement of the blade while traversing this portion of the surface has caused those portions of the blade which support the wiping edge, and which are normally formed of metal, to come into close proximity to the windshield. Further, in such a conventional assembly the blade-to-glass angle changes, so that the blade wiping edge does not maintain, with relation to the glass, the blade posture necessary for effective wiping action. Thus any inaccuracy in pivot shaft alignment, any deformation of the arm, any build-up of manufacturing tolerance in the arm and blade, or any other deviation affecting the relative positions of pivot shaft, arm, blade and/or glass, may well cause the metal parts to come in contact with the windshield, causing scratching of the windshield, in addition to the poor wiping action of the blade lying at an incorrect angle to the windshield. Therefore, it is necessary to maintain the blade wiping element or squeegee in correct position relative to the glass, both for effective wiping action and so that the blade metal parts are spaced adequately from the windshield.

The present invention now provides an improved wiper arm and blade assembly for the wiping of a vehicular windshield of varying curvature, such as a wrap-around windshield. As in any conventional wiper system, the arm and blade may be disposed for movement about a fixed axis defined by an oscillatable pivot shaft.

In order to accomplish this result, the present invention proposes the interconnection of the blade and the arm through a joint which accommodates bi-axial arm-to-blade movement while retaining the blade and arm in substantial longitudinal alignment for joint oscillating movement about the actuating shaft of the wiper system. The blade and arm are interconnected for pivotal movement about a first or primary axis transverse to the longitudinal axis of both the arm and the blade, so that the blade is movable in substantially the vertical longitudinal plane of the arm to accommodate the blade wiping surface to varying angular contours of the windshield. Additionally, the arm and blade are interconnected for movement about a secondary axis which lies substantially in the longitudinal vertical plane of the arm and blade at their point of connection. Movement about the secondary axis affects the degree of tilt of the blade relative both to the arm and to the windshield surface.

The blade is thus movable relative to the arm about both the spaced, substantially normally disposed primary and secondary axes. The blade is movable relative to the glass in the path of tilt about the secondary axis.

To correlate the movement of the arm relative to the blade about these two axes, the arm and the blade are provided with cooperating motion-transmitting surfaces, which preferably take the form of contacting relatively inclined abutment surfaces. These surfaces, in the form of the invention shown herewith, in effect, bridge the two axes of relative movement between the arm and the blade, so that a given degree of movement of the arm relative to the blade about the primary axis (as is necessary to accommodate longitudinal conformation of the blade wiping edge to the glass) produces a correlated degree of movement of the blade wiping edge about the secondary axis.

To give the assembly maximum functional adaptability to a particular windshield formation, without varying the dimensions or shape of the perhaps standardized functional parts which are disposed between the outer end of the arm and the blade, thus avoiding costly deviation in production operations, the portion of the arm between the pivot shaft and the outer end of the arm (preferably a portion near the outer end of the arm) may be bent substantially in the longitudinal vertical plane of the arm, so as to alter the position, within the arc of movement of the arm, at which a predetermined degree of tilt of the blade with relation to the arm is attained. A similar result may be obtained by varying the design and positional relationship of said functional parts from such standardized forms, if for any reason the bending of said arm, as above described, is not desirable.

It is, therefore, an important object of the present invention to provide an improved windshield wiper arm and blade assembly for the wiping of a vehicular windshield of varying surface contour.

Another important object of the present invention is the provision of an improved assembly, including a windshield wiper arm and a wiper blade which are relatively movable about a plurality of axes to accommodate blade-to-arm movement, so that the blade can conform to the windshield, and to accommodate additional blade-to-arm movements, so that the blade can be retained in an effective wiping posture substantially erect to the windshield surface.

It is a further object of the present invention to provide an improved windshield wiper system including a windshield wiper blade movable relative to a windshield wiper actuating arm about one axis transverse to the arm and about another axis generally parallel to the arm, the arm and the blade being provided with cooperating motion-transmitting means which correlate motion of the blade relative to the arm about the two axes, so that the blade may readily conform to the varying surface contour of the windshield, while being maintained substantially erect to the windshield surface.

Yet another important object is the provision of an improved arm-blade connection for a windshield wiping system, the connection accommodating arm and blade movement about a fixed axis of actuation, while accommodating relative blade-to-arm movement in separate, but correlated, arcuate paths which effect a compound arm-to-blade movement to insure accurate and effective wiping contact between the blade and windshield surface.

Yet another object is to provide a windshield wiper arm and blade combination in which the blade and the arm are relatively movable about a pair of angularly disposed axes and are co-movable about a fixed axis of actuation, relative blade-to-arm movement about the angularly disposed axes causing the blade to conform longitudinally to a windshield and in substantially erect position relative thereto, the combination being adaptable to windshields of varying contour by varying the inclination of one of the angularly disposed axes relative to the fixed axis of actuation.

Still another important object of the present invention is the provision of an improved windshield wiping apparatus wherein a wiper blade is disposed upon an actuating arm for bi-axial relative movement in correlated arcuate patterns about individual axes, the correlation of these arcuate movements resulting in the maintenance of the blade in effective wiping attitude with respect to a windshield surface of varying curvature.

Other and further important objects of the present invention will become apparent from a study of the detailed description of the invention as hereinafter set forth and an inspection of the appended drawings.

On the drawings:

FIGURE 1 is a schematic perspective view of a windshield of the "wrap-around" type which the windshield wiping system of the present invention is adapted to wipe, the relative positions of the windshield wiper arm and blade being indicated schematically on the windshield at various positions throughout the wiping pattern, as denoted by the reference characters A, B, and C;

FIGURE 1A is a fragmentary, composite illustration of the relative arm, blade, and windshield positions when the arm and blade occupy the position indicated at A in FIGURE 1, this view being a composite of a side elevational view of the arm-to-blade connection and a transverse sectional view of the arm, blade, and windshield;

FIGURE 1B is a fragmentary, composite illustration similar to FIGURE 1A, but showing the arm and blade occupying the position indicated at B in FIGURE 1;

FIGURE 1C is a fragmentary, composite illustration similar to FIGURES 1A and 1B, but showing the arm and blade occupying the position indicated at C in FIGURE 1;

FIGURE 2 is an enlarged sectional view taken along the plane 2—2 of FIGURE 1;

FIGURE 3 is an enlarged sectional view taken along the plane 3—3 of FIGURE 1;

FIGURE 4 is a fragmentary, exploded, perspective view of the arm-to-blade connection; and FIGURE 5 is a view similar to FIGURES 1A and 1C, illustrating the manner in which the arm may be bent to vary the operating characteristics of the arm and blade combination of the present invention.

As shown on the drawings:

In FIGURE 1, reference numeral 10 refers generally to a windshield of the "wrap-around" type, only one-half, i.e., the driver's half, of the windshield being shown for clarity of illustration. The exterior surface 10a constitutes the surface of the windshield to be wiped. The upper edge 11 of the windshield is disposed adjacent the header portion of the vehicular roof panel and its lower edge 12 is disposed adjacent the cowl of the vehicle, and the lateral extremity or "wrap-around" portion of the windshield is designated 13.

It will be appreciated from an inspection of FIGURE 1 of the drawings that the windshield 10 is of appreciable lateral curvature, and that the vertical inclination thereof varies across the lateral extent of the windshield, as best seen by a comparison of FIGURES 2 and 3.

While there is shown and described herewith a particular configuration of windshield, it will be understood that the subject invention is readily adaptable to the efficient wiping of a practically limitless number of windshields of varying configuration, each differing from the illustrated example and from each other.

As shown in FIGURES 2 and 3, the windshield wiper system for utilization with the windshield 10 includes an actuating or pivot shaft 15 which is located at the cowl section of the vehicle, generally beneath and forward of the windshield 10. This pivot shaft 15 has secured thereto by suitable means, as are well known in the art, a windshield wiper actuating arm, indicated generally at 16. The arm 16 includes an inner or attaching section 17 which is secured to the pivot shaft 15 by a suitable means, also as are well known in the art. The section 17 of the arm 16 is provided with a portion 18 extending radially of the shaft 15 and an outer arm section 20 is pivoted thereto by a pin 19. The pivot pin 19 traverses both the arm sections 17 and 20 and secures the two sections together for relative pivotal movement. A tension spring 21 joins adjacent portions of the inner arm section 17 and the outer arm section 20, the spring 21 being effective to urge the outer end of the outer arm section 20 toward the windshield 10, all as illustrated in FIGURE 2 of the drawings.

The outer section 20 of the arm overlies the windshield, and is adapted to be connected to a windshield wiper blade, indicated generally at 25. The wiper blade 25 comprises a wiping element 26, preferably formed of rubber or a similar elastomeric material, and sometimes referred to as a squeegee element. The wiping element has a longitudinally extending wiping edge 27 which is resiliently conformable to the curved exterior surface 10a of the windshield.

The wiping element 26, as best illustrated in FIGURES 1A, 1B, and 1C, is provided with a pair of longitudinally extending, opposing, outwardly opening grooves 28 within which are seated resiliently flexible, preferably metallic supporting elements 29. These elements 29 project laterally beyond the confines of the elongated rubber element 26, and are adapted to be engaged by a pressure applying superstructure including spaced links 30 and 30a which are slidably mounted on the metallic supporting elements 29 and joined by a centeral bridge member 31 which has its ends pivotally attached to medial portions of the links 30. This general blade design is fully disclosed and claimed in my Patent Number 2,596,063.

It will be understood that the specific blade construction illustrated in the drawings of this application, while highly desirable because of its excellent wiping characteristics, is not essential to the operation of the present invention, and that the arm and blade assembly contemplated by this invention may utilize any specific blade which will effectively conform to the curved exterior surface 10a of the windshield 10.

The blade 25 is attachable to the arm 16 for concurrent oscillation across the surface 10a of the windshield 10. One form of arm-to-blade attachment of the present invention is illustrated in FIGURE 4 of the drawings. From this figure, it will be seen that the central bridge element 31 of the blade 25 is provided with a pair of apertures 32 longitudinally spaced along the length of the bridge and adapted to receive therein rivets 33 which secure an abutment member, indicated generally at 35, to the blade 25. The abutment member 35, constituting abutment means, is provided with laterally spaced arcuate extremities 36 which conform generally to the convex exterior curvature of the bridge 31. Intermediate these extremities 36, the abutment member 35 has integral upstanding flanges 37 which serve to join the arcuate extremities 36 to a medial planar portion providing a surface 38. The planar medial portion is provided with apertures 39 through which the rivets 33 extend into the apertures 32 of the bridge 31, so as to secure the abutment member 35 to the bridge 31. The flanges 37 elevate the planar portion generally above the blade bridge member 31 to provide flat abutment means which, when secured to the bridge 31 by the rivets 33, becomes functionally an integral part of the blade 25. Obviously, the bridge itself may be formed to provide such a flat abutment surface, if desired.

Preferably integrally formed with the arcuate extremities 36 of the abutment member 35 are a pair of upturned ears 40 which are apertured, as at 41 to receive therethrough an elongated pivot pin or pivot shaft 42 which, in the illustrated embodiment of the invention, lies in an axial plane substantially parallel to the abutment surface 38.

Adapted to be interposed between the ears 40, in such manner as to be superimposed over the plane surface 38 of the abutment member 35, is a joint member or block 45. This joint member 45 is formed, in the illustrated embodiment, from a solid piece of metal, although it will be appreciated that the block may be formed in other ways, as by stamping or the like. The block 45 is provided with an elongated bore 46 adapted to receive the pivot pin or pivot shaft 42 therethrough. When the pivot pin 42 is threaded through the aperture 41 of one of the ears 40, the bore 46 of the member 45, and the other aperture 41 of the other ear 40 of the abutment member 35, the pin supports the block for pivotable movement relative to the blade 25 and the yoke or bridge 31 thereof.

The joint block or pivot element 45 is provided with a pair of transverse recesses 47 on the under-side thereof to provide the necessary clearance between the joint block and the heads of the rivets 33. The joint member or swingable member 45 is provided with a transverse bore 49 which is located in spaced relation to, and preferably normal to, the longitudinal bore 46 therein, and the upper surface 48 of the member 45 is arcuate in contour to accommodate relative movement between the arm 16 and the member 45.

The outer end of the arm section 20 is preferably laterally offset, as at 20a, so that the blade and arm may conform to the cowl molding of the vehicle, when the arm and the blade are in their parked position. The lateral offsetting of the arm is conventional in the art for this purpose.

The outer end of the arm section 20 has secured thereto a connector member 50, preferably formed of stamped sheet metal and rigidly secured to the end of the arm in any suitable manner. The connector member 50 is generally of an inverted U-shape, and the connection to the arm is preferably formed by turning under the extremities of depending legs 51 formed at the inner end of the connector member 50, so that the extremities lie in close physical contact with the arm. At the outer end of the connector member 50, the generally U-shaped configuration thereof is provided by an upper or bight portion 52 and depending, laterally spaced leg portions 53 and 54. The leg portions 53 and 54 terminate in lower marginal edges 55 and 56, respectively, which extend generally longitudinally of the arm and which are of a longitudinal contour to be hereinafter more fully described.

The depending legs 53, 54 are provided adjacent their upper portions with laterally aligned apertures 57 which receive therethrough a second pivot pin or pivot shaft 58. This pivot pin or shaft 58 is adapted to extend through the legs 53, 54 of the connector member 50 and also through the transverse bore 49 of the joint member 45. The pivot shafts 58 and 42 are secured in position by any suitable means, as by peening over the end of the shafts after insertion of the shafts through the components to be pivotally joined.

Although the component parts of the present invention are best illustrated in FIGURE 4 of the drawings, the best understanding of the operation of the invention will be gained by a study of FIGURES 1, 1A, 1B, 1C, 2 and 3. It will be noted from FIGURES 2 and 3 that the planar abutment surface 38 of the abutment element 35 lies generally parallel to the lateral longitudinal plane of the blade 25, and that the pivot pin 42 lies in the vertical longitudinal plane of the blade, and in the longitudinal vertical plane of that portion of the arm which is connected to the blade 25.

The transverse pivot pin 58 lies in a plane which is generally normal to the longitudinal vertical plane of the blade and the arm.

The blade is movable relative to the arm about the transverse axis defined by the pivot pin 58. This movement is provided so that the longitudinal wiping edge of the blade can conform to the varying surface contour and the varying vertical inclination of the windshield surface as the blade traverses the windshield.

The blade and arm are also relatively movable about the axis of the pivot pin 42 which, as herebefore described, lies in the vertical longitudinal plane of the arm and the blade. This movement about the axis of the pin 42 controls the tilt of the blade relative to the windshield. As has been hereinbefore described, variations in this tilt are necessary in order that the blade may be maintained at a position substantially erect to the glass.

To correlate these two relative movements about the hereinbefore defined axes, the contoured edges 55 and 56, constituting abutment means, of the blade attachment member or connector 50 are utilized in conjunction with the abutment surface provided by the planar upper surface 38 of the abutment element 35. The blade 25 is movable relative to the contoured edges 55 and 56 of the member 50. The element 45 is movable relative to the arm about the axis of the pin 58, and the element 45 is movable relative to the bridge 31 about the axis of the pivot pin 42.

The traversing movement of the blade and arm across the windshield, as upon oscillatory actuation of the actuating shaft 15 by any suitable driving means, such as a vacuum motor, an electric motor, or a hydraulic motor, causes the blade to traverse portions of the windshield of varying vertical inclination with respect to the axis of the shaft 15. Thus, the spring pressure which is exerted by the spring 21 upon the outer end of the arm 16 urges the blade into engagement with the windshield, and this pressure causes the blade to longitudinally conform to the windshield surface. This conforming movement of the blade occurs primarily about the axis of the pivot pin 58. This relative movement of the blade and the arm about the axis of the pin 58 causes relative movement to occur between the contoured edges 55, 56 of the arm connector means 50 and the abutment surface 38 of the abutment means 35. Because of the shape and contour of the surfaces 55 and 56, as will be hereinafter described in detail, the blade moves relative to the arm about the longitudinal axis defined by the pin 42. This coordinated and concurrent movement about the two axes in effect causes the blade to be tilted relative to the arm about an axis biased between the two pin axes, so that it is maintained in a substantially upright or erect attitude with respect to a tangent plane of that portion of the windshield which is being traversed by the wiper blade.

This operation of the blade and the arm combination is shown in FIGURES 1A and 1B, and 1C. In these figures, it will be noted that the lower contoured edges 55 and 56 each provide an elongated, relatively flat portions 55a and 56a, respectively, which is inclined with respect to a longitudinal, lateral plane of the arm and which serves as a stop to limit the extent of arm-to-blade tilt. At one end of these relatively flat portions 55a and 56a of the edges 55 and 56, respectively, and namely at that portion of the edge which is spaced the greatest distance from the upper extremity of the arm, the relatively flat portions 55a and 56a of the arms merge through curved portions 55b and 56b with second substantially flat portions 55c and 56c. The second flat portions 55c, 56c of each edge 55, 56 are generally parallel to the longitudinal lateral plane of the arm. These second flat portions 55c and 56c terminate in curved portions 55d and 56d which merge into the vertical extremities of the legs 53 and 54. Additionally, it will be noted that the inclinations of the edges 55 and 56 are reversed. A portion of each of these contoured edges is preferably always in contact with the abutment surface 38 of the abutment element 35.

Relative movement of the blade with respect to the arm about the axis of the pin 58 inclines the abutment surface 38 with respect to the edges 55 and 56, and this fact is relied upon to cause the joint relative movement about the pair of normally disposed axes hereinbefore described.

As the blade 25 conforms to the varying windshield surface, the angularity of the blade relative to the arm changes to produce relative motion between the abutment surface 38 and the edges 55 and 56, since the surface 38 moves with the blade and the edges 55 and 56 are fixed with respect to the arm. The relatively reversedly curved portions 55b and 56b of the edges bear upon the abutment surface 38 and cause the abutment surface to tilt about the axis defined by the pivot pin 42, as shown in FIGURES 1A, 1B and 1C.

It will be noted that the abutment surface 38 cooperates with the parallel edges 55c and 56c throughout the range of oscillating movement of the blade from its parked position of FIGURE 1A to its substantially upright position of FIGURE 1B.

Since the portions 55c and 56c are parallel to the arm and to the medial lateral plane of the blade 25, the abutment surface 38 is retained in a position which holds the blade in an upright position with respect to the windshield surface. Expressed in another way, while the blade and arm traverse the windshield from their parked position to their upright position, the vertical longitudinal axis of the blade is parallel to the vertical longitudinal axis of the arm, and the blade is not tilted with respect to the arm.

As the blade and arm further traverse the windshield, the blade-to-arm tilt is varied, the windshield is appreciably curved toward its outer lateral edges and the vertical inclination of the windshield relative to the pivot shaft also changes. This change in vertical inclination causes movement of the blade relative to the arm about the transverse axis defined by the pin 58. Movement about the pin 58 moves the abutment surface 38 relative to the edges 55 and 56, so that the curved portions 55b and 56b now contact the surface 38. The blade is now tilted with respect to the arm about the axis of pin 42, and the blade and arm occupy a position such as that shown in FIGURE 1C.

By proper correlation of the portions 55a and 56a to the degree of movement of the blade relative to the arm about the axis of pin 58, it is possible to tilt the blade with respect to the windshield surface, so as to maintain the blade wiping edge at an effective wiping attitude to the surface, despite the variations in surface curvature.

I have found that it is possible to adapt the specific embodiment of the invention shown in FIGURES 1A, 1B and 1C to many forms of windshield different from that shown in FIGURE 1. This adaption is accomplished by merely bending the arm so as to deform it in the vertical longitudinal plane thereof, as indicated at 20a in FIGURE 5 of the drawings. The deformation of the arm 16 has the effect of altering the relative arm-to-blade position at which a given amount of blade-to-arm tilt is obtained. A comparison of FIGURES 1B and 5 illustrates this effect, since in both figures the relation of the abutment surface 38 to the edges 55 and 56 is the same, so the degree of tilt of the blade relative to the arm is the same, but the relative angularity of the blade to the arm about the axis of the pin 58 varies markedly.

The present invention thus provides a novel and improved mechanism for controlling the operation of a wiping apparatus for a windshield. The many advantages of the present invention will be well understood by those skilled in the art from the foregoing description. However, some of these advantages may not be immediately apparent and shall be explained in greater detail.

In other devices for generally similar purposes, a camming mechanism is used adjacent the bearing of the pivot shaft which drives the arm and the blade and which is located generally beneath the windshield. In such devices, the tendency of extraneous matter on the windshield, such as road grit, ice, snow, and rain, is to gravitate from the windshield downwardly to accumulate in and around the camming mechanism. This extraneous matter obstructs operation of the wiping mechanism and, in many instances, has an abrasive effect on the mechanism.

In the present invention, by contrast, the functional members employed to position the wiper blade correctly with relation to the windshield are disposed adjacent the blade end of the arm, where the rate of arm and blade travel across the windshield is highest and where the abrupt reversal of the direction of arm and blade travel, which occurs at each end of the stroke, tends to throw off such extraneous matter, thus freeing the functional members of extraneous matter and other abrasives, all of which results in greater durability of making parts and more dependable wiping performance.

Also, it is to be noted that, in the subject invention, the abutment means which control the wiping attitude of the blade with relation to the surface of the windshield are largely permissive in their function, i.e., the natural disposition of the blade is to move in the direction permitted by the abutment members. This means that the actual work load on the contacting surfaces of the cooperating abutment members is minimized, thus reducing friction and wear. It is also to be noted that the abutting edge of one of the controlling abutment members is of relatively thin cross section and, during the actual wiping movement of the blade from one extreme of its movement to the other extreme of its movement, with relation to the arm, traces only a short and narrow path on the cooperating abutment member, thus offering a very limited opportunity for objectionable extraneous matter to intervene.

Further, the blade is always stabilized laterally in the illustrated embodiment of the invention, since both of the edges 55 and 56 are in constant contact with the abutment surface 38 on the opposite sides of the longitudinal axis defined by the pivot pin 42. Of course, only one surface at a time can serve to limit the tilting motion of the blade relative to the arm, and if desired, the other surface can be formed so as to be spaced from the surface 38 during the period when the one surface is being utilized. However, the advantages of lateral stabilization of the blade will be appreciated.

Other advantages of the present invention include the restriction of the biaxial arm-to-blade movement to movement about definite, fixed axes defined by the pivot pins 42 and 58, the oscillatory co-movement of the arm and the blade at all phases of the wiping pattern, and the provision of excellent eye-level driver vision by the co-movement of the arm and the blade about the axis of actuation defined by the pivot shaft 15.

It will, of course, be understood that various details of construction may be varied through a wide range without departing from the principles of this invention, and it is, therefore, not the purpose to limit the patent granted hereon otherwise than necessitated by the scope of the appended claims.

I claim:
1. In a windshield wiper arm-and-blade assembly, an arm adapted to be oscillated by a pivot shaft across a surface to be wiped, an abutment member mounted on the wiper blade, a swingable member pivotally mounted for movement about an axis disposed on the blade, longitudinally with relation to the longitudinal axis of the blade, said arm being provided with means for connection to said swingable member for relative movement about a transverse axis transverse to said longitudinal axis, said abutment member being movable relative to said arm about said longitudinal and transverse axes and having portions respectively disposed reversely to move said abutment member alternately by bearing thereon at areas thereof lying respectively in different directions from the vertical planes respectively of said transverse axis and said longitudinal axis.

2. In a windshield wiper arm-and-blade assembly including arm-and-blade elements adapted to be oscillated across a surface to be wiped, an abutment member mounted on one of said elements, a pivot member carried by the one element, a swingable member mounted on said pivot member and disposed adjacent to said abutment member in substantial axial parallelism to said one element, pivot means joining said swingable member and the other of said elements for relative movement about an axis substantially normal to said pivot member, said other element having portions disposed to engage said abutment member and movable relative thereto to produce a relative movement between the abutment member and the swingable member according to relative movement of the elements about said axis.

3. A windshield cleaner comprising an oscillatable arm adapted to traverse a windshield of varying curvature, a blade carried by said arm for oscillating movement therewith, and means interconnecting said blade and said arm for relative movement, said means including a movable member connected to the blade and the arm, respectively, for relative pivotal movement, and cooperating motion-controlling means carried by said blade and said arm, respectively, for constraining the motion of said member to a resultant path of movement effective to maintain the blade substantially erect to the windshield.

4. A windshield wiper for use with a windshield of the curved type having an appreciable curvature comprising an arm adapted for oscillatory movement about a fixed axis and having an end adapted to sweep over the windshield, biasing means urging the end of said arm toward the windshield, a windshield wiper blade attachable to the said end of said arm, pivot means securing said blade to said arm end, said pivot means retaining the blade in substantial longitudinal alignment with said arm but accommodating free transverse pivotal movement of the blade relative to the arm and cooperating relatively movable abutment surfaces on said blade and said arm for limiting such movement, so that for any degree of relative movement of said surfaces the arm and blade are fixed relative to one another.

5. In a windshield wiper system for wiping a curved windshield surface having a portion thereof sharply receding from an actuating shaft of the system, a wiper arm adapted for attachment to the actuating shaft for oscillatory movement across the windshield surface, a wiper blade having a wiping edge elongate in general parallelism to said arm and conformable to the windshield surface, a joint for securing the blade to the arm, including a joint member interposed between said arm and said blade, separate bearing pins joining said member to said arm and to said blade, respectively, one of said pins lying generally parallel to said arm and said blade, and the other of said pins lying generally transverse to said arm and said blade, and cooperating abutment surfaces movable, respectively, arcuately about the corresponding one of said pins and being cooperable with one another to limit relative arm-blade movement about said one pin in accordance with the degree of arm-blade movement about said other pin as the arm and blade move across the receding portion of said windshield surface.

6. In a windshield wiper arm-and-blade assembly, an arm disposable on an oscillatory shaft to traverse a windshield glass of varying curvature and of varying vertical inclination, a blade for attachment to the arm for traversing movement therewith, a biaxial connection joining said arm to said blade and including pivot shafts spaced from one another and lying normally to one another to accommodate movement of the blade relative to the arm both toward and away from the glass and in a plane of tilt normal to the surface of the glass to be wiped, a first abutment surface fixed relative to said arm and movable arcuately relative to one of said pivot shafts, and a second abutment surface fixed relative to said blade and movable arcuately relative to the other of said pivot shafts, said surfaces being in contact and being effective to cause joint and predetermined relative movement about both of said pivot shafts during traversing movement of the blade and arm, so that the blade is tilted relative to the glass in accordance with the varying vertical inclination thereof.

7. In a windshield wiper system including an oscillatable pivot shaft and a windshield of variant vertical inclination and having a substantial curvature, a wiper arm mounted on the shaft and biased toward the windshield, and a wiper blade carried by the arm to traverse the windshield, the windshield-to-pivot shaft distance and inclination varying within the path of blade traverse on the windshield, the improvement which comprises a joint between said arm and said blade accommodating movement of the blade relative to the arm in response to the curvature of the windshield and also accommodating blade-to-arm tilt about an axis lying generally in a plane substantially parallel to the longitudinal axis of the blade, and contacting abutment elements on said blade and said arm and having surfaces movable relatively as the windshield-to-pivot shaft inclination varies to limit the extent of blade-to-arm tilt to that necessary to maintain the blade substantially erect to the curved windshield surface.

8. In a windshield wiper arm-and-blade assembly, connecting means for maintaining the arm and the blade in pivotable operable association with each other, control means associated with said pivotal means for determining the position of the blade with relation to the arm to maintain said blade in substantially erect position with relation to an irregularly curved windshield as it traverses that windshield, said control means being disposed adjacent the outer end of the wiper arm and adjacent the medial portion of the blade, said control means between the arm and blade including a bearing surface on one and a pair of oppositely arranged portions on the other disposed obliquely to the longitudinal axis of the blade for engaging said bearing surface to maintain the blade in said erect position.

9. In a windshield wiper arm-and-blade assembly, a wiper arm element adapted adjacent one of its ends to be secured to a driven member for oscillation thereby, a wiper blade element, a connector assembly carried adjacent the free end of said arm, said assembly being rockably connected to said blade and said arm, said connector assembly having coacting parts constructed and arranged to transmit arm pressure at spaced-apart points in biased relationship to and on opposite sides of the longitudinal axis of one of said elements, whereby to urge said blade toward and erect position with relation to a windshield in response to changes in angular relationship between the longitudinal axis of the arm and the longitudinal axis of said blade as the wiping element follows varying curvatures of the windshield.

10. In a windshield wiper arm-and-blade assembly an elongate windshield wiper arm adapted at one of its extremities to be secured to a driven member for oscillation thereby across the surface of an irregularly curved windshield and carrying at its other extremity a member connected to an elongate wiper blade element adapted to conform readily to the surface of the windshield in traversing such surface under pressure applied by the arm, said member having relative pivotal movement with relation to said arm and blade, said member connecting said blade and said arm embodying coacting pressure-transmitting portions being disposed on opposite sides of the longitudinal axis of said blade and being arranged in biased relationship to said axis, whereby to urge said blade toward an erect position with relation to a windshield in response to changes in angular relationship between the longitudinal axis of the arm and the longitudinal axis of said blade as the wiping element follows varying curvatures of the surface of the windshield.

11. In a windshield wiper blade-and-arm assembly, a windshield wiper arm, a wiper blade subassembly embodying a readily flexible wiping element and multipart means for receiving and distributing, at spaced-apart points on said element, pressure applied by the arm, said subassembly having means for accommodating biaxial movement and being adapted to conform the wiping element to varying curvatures of a curved windshield, said subassembly being rockably connected to said wiper arm adjacent the outer extremity of said arm, said wiper arm being provided at its opposite extremity with means for securing it to a pivot shaft, for oscillation thereby, a controlled element carried by said subassembly and having spaced pressure-receiving portions disposed on opposite sides of but in generally parallel alignment biased with relation to the longitudinal axis of said subassembly, a controller element carried by said arm and having pressure-applying portions disposed in substantially the same alignment as said portions of said controlled element and having spaced pressure-applying elements that are constructed and arranged to coact therewith whereby to urge said subassembly toward an erect position with relation to the windshield in response to changes in the angular relationship between the longitudinal axis of the arm and the longitudinal axis of said subassembly as the wiping element follows varying curvatures of the windshield.

12. A windshield wiper blade assembly having a readily flexible elongate wiping member and carrying a controlled element having operative portions arranged in spaced relation to the longitudinal axis of the assembly, said wiper blade assembly being adapted to conform to varying curvatures of a curved windshield, an elongate windshield wiper arm adapted to be secured at one of its extremities to a pivot shaft for oscillation thereby, means for connecting the blade to the arm in a manner to accommodate biaxial movement, said arm carrying a controller element adapted to coact with said controlled element whereby to urge said blade toward an erect position with relation to the windshield in response to changes in the angular relationship between the longitudinal axis of the arm and the longitudinal axis of the blade as the blade follows varying curvatures of the windshield.

13. In a windshield wiper arm-and-blade general assembly, elements including an elongate windshield wiper arm subassembly provided at one of its extremities with a head adapted to secure it to a pivot shaft powered to oscillate said arm across the surface of a windshield, a wiper blade subassembly connected to said arm adjacent its other extremity, a means for providing a biaxial rockable connection between said arm and blade, said blade subassembly being readily conformable, under pressure applied by the arm subassembly, to the varying curvatures of the surface of a windshield, coacting control members rockingly associated with said biaxial connecting means for directing the movement of relatively movable segments of said general assembly, said control members being disposed at an acute angle with relation to the longitudinal axis of one of said elements, whereby to urge said wiper blade toward an erect position with relation to a windshield in response to changes in angular relationship between the longitudinal axis of the arm and the longitudinal axis of the blade as the blade follows varying curvatures of the windshield.

14. A windshield wiper blade assembly adapted to conform a wiper blade to varying curvatures of the surface of a curved windshield, said assembly embodying a readily flexible wiping element and a multipart pressure-distributing structure connected therewith, an elongate windshield wiper arm assembly connected at one of its extremities to said blade assembly, means to connect said arm and blade in a manner to accommodate biaxial movement of the blade relative to the arm, said arm assembly having at its other extremity a head adapted to be secured to, and oscillated by, a pivot shaft driven by a windshield wiper motor, coacting bearing elements disposed in biased relationship with the longitudinal axis of at least one of said assemblies, said bearing elements being operatively disposed between said head and said wiping element whereby to urge said blade toward an erect position with relation to the windshield in response to changes in the angular relationship between the longitudinal axis of the arm and the longitudinal axis of the blade as the blade follows varying curvatures of the windshield.

15. A windshield cleaner comprising an oscillatable wiper arm and a blade carried thereby for wiping the surface of the windshield, a rockable connection between the arm and blade permitting relative movement between the same for tilting the blade both lengthwise and sidewise relative to the arm, said connection having spaced contacting portions arranged in biased relation to the general longitudinal axis of the blade so as to confine said relative movement to concurrent longitudinal and sidewise tilting in a predetermined path, said contacting portions being positioned to maintain the blade substantially erect to the windshield surface being wiped.

16. A windshield wiper having an elongate arm and blade in combination for wiping a curved windshield, comprising a means for oscillating the arm, a connection for mounting the blade at the free end of the arm, said connection including means for accommodating biaxial movement of the blade relative to the arm, and means to control tilting of the blade about the axis of its length in proportion to any pivoting movement about an axis transverse thereto which pivoting movement is produced by oscillating the blade over the curved windshield.

17. A windshield wiper having an elongate arm and blade in combination for wiping a curved windshield, comprising a means for oscillating the arm, a connection for mounting the blade at the free end of the arm, said connection including means for accommodating biaxial movement of the blade relative to the arm, and means to control tilting of the blade in one of said directions about the axis of its length in proportion to any movement in the other of said directions about an axis transverse to said first axis and lying generally parallel to the frontal plane of said windshield, such biaxial movement being produced by oscillating the blade over the curved windshield.

18. A windshield wiper having an elongate arm and blade in combination for wiping a curved windshield, comprising a means for oscillating the arm, a connection for mounting the blade at the free end of the arm, said connecting including means for accommodating a controlled coordinated and concurrent biaxial movement of the blade relative to the arm, and means to control and coordinate the tilting of the blade about the axis of its length in proportion to any movement about an axis transverse thereto produced by oscillating the blade over the curved windshield.

19. In a wiper mechanism for wiping curved windshields, means for supporting and moving a wiper blade over the surface of said windshield, said means being elongate and comprising a mounting section for attachment to a drive means and a wiper carrying section pivotally connected together for relative movement about a longitudinal axis and a transverse axis, one section having cam lobe portions engaging a bearing surface on the other section at opposite sides of the axes to rock the wiper carrying section about the longitudinal axis with rocking about the transverse axis to maintain the wiper blade substantially normal to the surface being wiped.

20. A self-contained wiper normalizing actuating arm unit for holding a wiper in a normal attitude while oscillating across a curved surface contour, comprising a mounting section and a wiper carrying section pivotally connected to the mounting section for relative lateral rocking movement about a substantially longitudinal axis, said arm unit having position controlling cam means on one section rotatable on a transverse axis having contact with the other section at opposite sides of both axes to so rock the wiper carrying section.

21. A wiper normalizing arm for curved windshield cleaners, comprising a mounting section and a wiper carrying section pivotally connected together for relative movement about a longitudinal axis and a transverse axis, and a self-contained normalizing mechanism wholly supported by the two sections and operable by such relative movement about the transverse axis to rock the carrying section about the longitudinal axis to maintain a substantially constant wiper normalizing position, one section having cam lobe portions engaging a bearing surface on the other section at opposite sides of the longitudinal axis to rock the wiper carrying section about the longitudinal axis.

22. A wiper normalizing arm for curved windshield cleaners, comprising a mounting section and a wiper carrying section pivotally connected together for relative movement about a longitudinal axis and a transverse axis, one section having cam lobe portions engaging a bearing surface on the other section at opposite sides of the axes to rock the wiper carrying section about the longitudinal axis with rocking thereof about the transverse axis.

23. A wiper normalizing construction for curved windshield cleaners comprising, a wiper arm having a mounting section, a wiper carrying section hinged to the mounting section for pivotal movement relative thereto about transverse and longitudinal axes, one of said sections having a pair of longitudinally spaced cam lobes in laterally offset relation to said longitudinal axis and the other of said sections having a bearing surface upon which the cam lobes ride during relative pivotal movement between said sections about said transverse axis to adjust said wiper carrying section about said longitudinal axis for maintaining position with a curved surface being traversed by the arm whereby to maintain a supported wiper substantially normal thereto, and resilient means acting to produce relative pivotal movement between said sections.

References Cited by the Examiner

UNITED STATES PATENTS

| | | | |
|---|---|---|---|
| 1,779,344 | 10/1930 | Tarver | 15—255 |
| 2,641,007 | 6/1953 | Krohm | 15—255 |
| 2,691,186 | 10/1954 | Oishei | 15—255 |
| 3,035,296 | 5/1962 | Deibel | 15—250.33 X |

ROBERT W. MICHELL, *Primary Examiner.*

CHARLES A. WILLMUTH, *Examiner.*